(12) United States Patent
Stephenson et al.

(10) Patent No.: US 6,900,876 B2
(45) Date of Patent: May 31, 2005

(54) PROCESS AND STRUCTURES FOR SELECTIVE DEPOSITION OF LIQUID-CRYSTAL EMULSION

(75) Inventors: Stanley W. Stephenson, Spencerport, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 39 days.

(21) Appl. No.: 10/365,819

(22) Filed: Feb. 13, 2003

(65) Prior Publication Data

US 2004/0160550 A1 Aug. 19, 2004

(51) Int. Cl.$^7$ .............................................. G02F 1/133
(52) U.S. Cl. ...................... 349/187; 349/152; 349/86; 349/92
(58) Field of Search ......................... 349/92, 187, 86, 349/152

(56) References Cited

U.S. PATENT DOCUMENTS

| | | | |
|---|---|---|---|
| 4,140,016 A | | 2/1979 | Fergason |
| 4,435,047 A | | 3/1984 | Fergason |
| 4,699,470 A | * | 10/1987 | McLaughlin et al. ........ 349/152 |
| 4,789,858 A | * | 12/1988 | Fergason et al. ............ 345/104 |
| 5,073,219 A | * | 12/1991 | McArdle et al. ............ 156/242 |
| 5,142,644 A | * | 8/1992 | VanSteenkiste et al. ...... 349/86 |
| 5,183,585 A | | 2/1993 | Koyama et al. |
| 5,289,300 A | | 2/1994 | Yamazaki et al. |
| 5,416,622 A | * | 5/1995 | Engfer et al. ................ 349/149 |
| 5,636,044 A | | 6/1997 | Yuan et al. |
| 5,868,892 A | * | 2/1999 | Klima, Jr. .................... 156/267 |
| 6,204,908 B1 | * | 3/2001 | Hashimoto et al. ......... 349/176 |
| 6,236,442 B1 | | 5/2001 | Stephenson et al. |
| 6,262,697 B1 | | 7/2001 | Stephenson |
| 2002/0197469 A1 | | 12/2002 | Clikeman |

FOREIGN PATENT DOCUMENTS

| | | |
|---|---|---|
| EP | 0778440 | 6/1997 |
| EP | 1058147 | 12/2000 |
| EP | 1225471 | 7/2002 |

* cited by examiner

*Primary Examiner*—Kenneth Parker
(74) *Attorney, Agent, or Firm*—Chris P. Konkol

(57) ABSTRACT

The invention relates to a method of forming a display comprising the steps of (a) providing a substrate; (b) forming a plurality of first conductors over the substrate; (c) depositing a layer of cholesteric liquid-crystal material, in the form of droplets of liquid crystal in a liquid carrier, over a preselected area of each of said first conductors so that a preselected portion of each of said first conductors is uncoated; (d) drying the liquid carrier to form a layer of polymer-dispersed cholesteric-liquid-crystal domains in a continuous matrix; and (e) forming a plurality of second conductors, electrically isolated from the first conductors, over the layer of polymer-dispersed liquid-crystal domains so that an electric field between the second conductors and the uncoated portions of the first conductors is capable of changing the optical state of the polymer-dispersed cholesteric liquid-crystal material. The absence of a coating over the second conductors permits connection to the first conductors without additional processing steps. The invention is also directed to a display element made by the method and to an array of display elements that represent an intermediate in the production of the final form of the display elements.

16 Claims, 10 Drawing Sheets

PROCESS AND STRUCTURES FOR SELECTIVE DEPOSITION OF LIQUID-CRYSTAL EMULSION

FIELD OF THE INVENTION

The present invention relates to a display system having a selectively deposited polymer-dispersed cholesteric-liquid-crystal material that can change optical states.

BACKGROUND OF THE INVENTION

Materials comprising cholesteric liquid crystals, also referred to as "chiral nematic" liquid crystals, are capable of maintaining a plurality of different optical states in the absence of an electrical field. Additionally, the optical state of the cholesteric liquid-crystal material can be changed from one state to another in response to applied electrical and/or thermal fields. These properties make these materials useful in the development of field-stable, rewritable displays.

In particular, cholesteric liquid-crystal materials are capable of being electrically driven, at ambient temperatures, between a reflective planar state (reflecting a specific visible wavelength of light) and a light-scattering focal-conic state. Cholesteric liquid-crystal materials have the capacity of maintaining these two optical states, planar or focal-conic, in the absence of an electric field. For example, U.S. Pat. No. 5,437,811 issued Aug. 1, 1995 to Doane et al. discloses a light-modulating cell having a polymer-stabilized chiral-nematic liquid-crystal material that is capable of switching between a planar state, reflecting a specific visible wavelength of light, and a weakly light-scattering focal-conic state.

U.S. Pat. No. 5,636,044 discloses a bistable cholesteric display. Two patterned substrates, made of glass or plastic, face each other. Cholesteric material is disposed between the two substrates or plates. The cholesteric material can contain a polymer gel or dye. Electrodes are exposed by offsetting the substrates to expose connection areas on the substrates. The display is built by bonding the two substrates together and then filling the cell with liquid-crystal material, after which radiation is applied to create polymer threads in the display that stabilize the cholesteric material. Cholesteric material processed in such a manner is known as a polymer stabilized cholesteric (PSC). Such displays require two substrates.

U.S. Pat. No. 4,140,016 discloses a plurality of selectively deposited cholesteric materials disposed on a substrate to create a temperature sensing paddle. The cholesteric materials are encapsulated using closed-core microencapsulation. The materials can be deposited by a variety of processes such as gravure printing, silk screen printing, and the like. There are no electrodes in the structure that permit an electric field to be applied across the cholesteric material. Such materials change state only in the presence of a specific temperature, and cease to maintain the second state in the absence of an specific temperature.

Fabrication of flexible, electronically written display sheets is disclosed in U.S. Pat. No. 4,435,047 issued Mar. 6, 1984 to Fergason. An emulsion of nematic liquid crystal in water is coated over a plastic sheet having a low-resistance ITO coating. A doctor blade is used to cast the emulsion over the sheet at a specific thickness. The liquid crystal material is a nematic liquid crystal with a dye that can be electrically switched between a transparent and light-blocking state. The display ceases to present an image when de-energized. The coated electrode is unpatterned, and contacted by a single electrical lead. No mention is made as to how the first electrode is kept free of coated materials that are coated over the first conductor.

U.S. Pat. No. 5,289,300 discloses a liquid-crystal material formed over a semiconductor array. The material is a UV-cured polymer-dispersed cholesteric liquid-crystal material. Coating methods disclosed include solvent coating of the polymer, including water and hydrocarbon solvents, using methods including doctor blades or roll coating. No methods are disclosed that describe how the inner electrodes are clear of the polymer-dispersed overcoat.

U.S. Pat. No. 6,262,697 discloses a coated polymer-dispersed liquid-crystal layer. An inner electrode is buried under the polymer-dispersed material. The author discloses the use of a piercing pin to form connection to the inner electrodes. U.S. Pat. No. 6,236,442 discloses another means for connecting to an inner conductor coated with polymer-dispersed liquid-crystal material. Overcoated layers are removed to expose a power area that permits connection to an inner transparent, electrically conductive layer.

It would be useful to have a process and structure to improve the manufacture of a display in which a polymer-dispersed cholesteric material is built-up on a substrate. It would be advantageous for the process not to require the removal of previously coated layers.

SUMMARY OF THE INVENTION

The need is met according to the present invention by a method of forming a display comprising the steps of (a) providing a substrate; (b) forming a plurality of first conductors over the substrate; (c) depositing a layer of cholesteric liquid-crystal material, in the form of droplets of liquid crystal in a liquid carrier, over a preselected area of each of said first conductors so that a preselected portion of each of said first conductors is uncoated; (d) drying the liquid carrier to form a layer of polymer-dispersed cholesteric-liquid-crystal domains in a continuous matrix; and (e) forming a plurality of second conductors, electrically isolated from the first conductors, over the layer of polymer-dispersed liquid-crystal domains so that an electric field between the second conductors and the uncoated portions of the first conductors is capable of changing the optical state of the polymer-dispersed cholesteric liquid-crystal material.

The present invention has the advantage that minimal amounts of polymer-dispersed cholesteric material are deposited. The absence of a coating over the second conductors permits connection to the first conductors without additional processing steps.

DETAILED DESCRIPTION OF THE PREFERRED EMBODIMENTS

Figure 1:
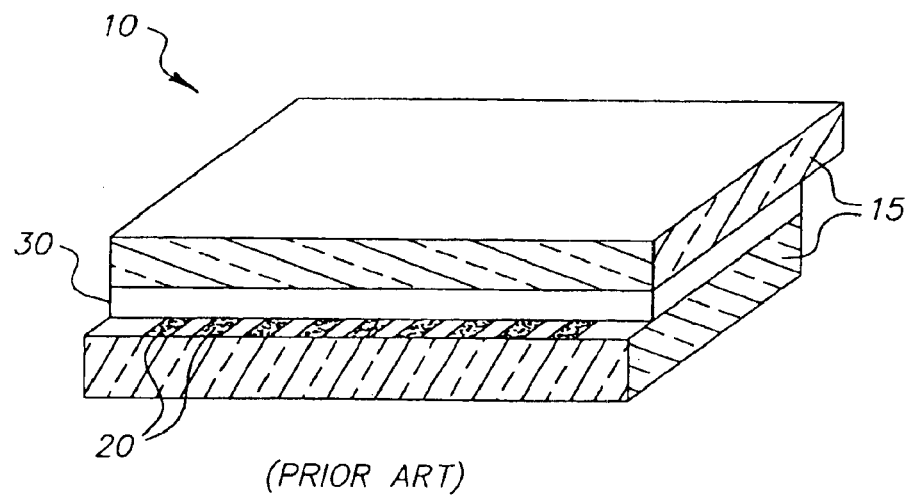
FIG. 1 is an isometric view of a prior-art display element.

Referring to FIG. 1, a display element 10 according to prior art is shown, and includes two substrates 15, made of either glass or plastic. As used herein, the term "display element" will refer to a display and manufacturing intermediates thereof A display element can be viewed as complete when comprising all components used in the final product which may be either connectably separate from, or integral with, other components such as a drive mechanism and a source of power. In the display element of FIG. 1, conductors are formed in each of the two substrates, and an extended face portion of one substrate 15 provides exposed first conductors 20 for interconnection with an electric field source. A polymer-dispersed cholesteric layer 30 is present between the two substrates 15 and, when the display element is operated on by an electrical field (via appropriate connections), can provide an image on the display element 10. According to the prior art, a seal is provided around the perimeter of the two substrates 15 prior to filling the "cell" in order to retain liquid polymer-dispersed cholesteric layer 30. Cholesteric liquid is then wicked between the two substrates 15. In certain cases, radiation is applied through the substrate 15 to form polymer networks within the cholesteric liquid-crystal material.

Figure 2:
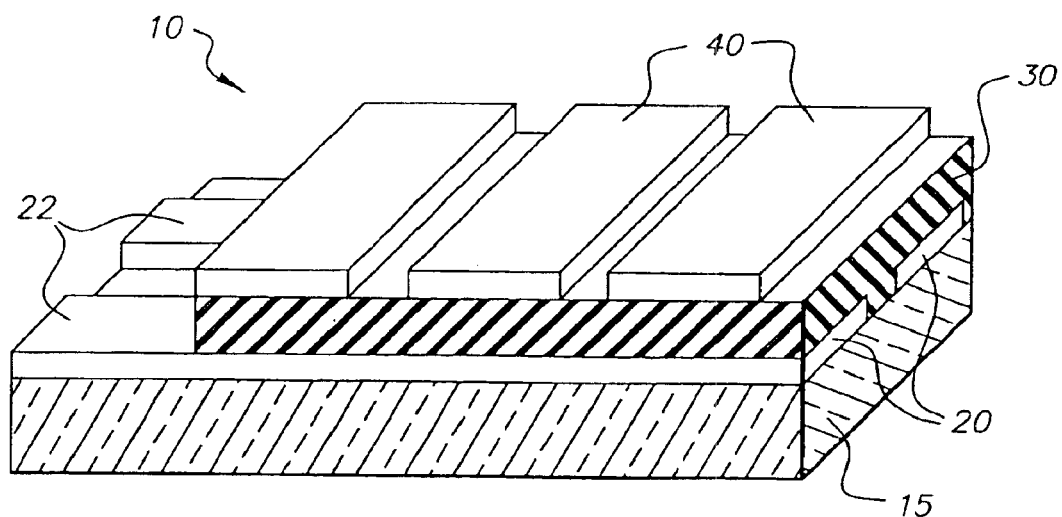
FIG. 2 is an isometric view of a display element in accordance with the present invention.

FIG. 2 is an isometric view of a display element 10 in accordance with one embodiment of the present invention. Flexible substrate 15 can be a thin transparent polymeric material such as Kodak Estar® film base formed of polyester plastic that has a thickness of between 20 and 200 micrometers. In an exemplary embodiment, substrate 15 can be a 125-micrometer-thick sheet of polyester film base. Other polymers, such as transparent polycarbonate, can also be used. In contrast to FIG. 1, display element 10 only requires a single substrate, for reasons that will become obvious below.

In FIG. 1, first conductors 20 are formed over substrate 15. First conductors 20 can be, for example, tin-oxide or indium-tin-oxide (ITO), with ITO being the preferred material. Typically, the material of first conductors 20 is sputtered as a layer over substrate 15 having a resistance of less than 500 ohms per square. The layer is then patterned to form first conductors 20 in any well-known manner. Transparent first conductors 20 can also be formed by printing a transparent organic conductor such as PEDT/PSS, PEDOT/PSS polymer, which materials are sold as Baytron® P by Bayer AG Electronic Chemicals.

Alternatively, first conductors 20 can be an opaque electrical conductor material such as copper, aluminum or nickel. If first conductors 20 are an opaque metal, the metal can have an oxidized surface to provide a light-absorbing surface. First conductors 20 can be formed in a conductive coating by conventional lithographic or laser etching means.

A polymer-dispersed cholesteric layer 30 covers portions of first conductors 20, leaving uncoated exposed first conductors 22. Polymer-dispersed cholesteric layer 30 includes a polymeric-dispersed cholesteric liquid-crystal material, such as those disclosed in U.S. Pat. No. 5,695,682, the disclosure of which is incorporated by reference. Application of electrical fields of various intensity and duration can drive a chiral-nematic (cholesteric) material into a reflective state, to a transmissive state, or an intermediate state. These materials have the advantage of maintaining a given state indefinitely, after the field is removed. Cholesteric liquid crystal materials can be, for example, Merck BL112, BL118 or BL126, available from E.M. Industries of Hawthorne, N.Y.

In a preferred embodiment, polymer-dispersed cholesteric layer 30 is E.M. Industries' cholesteric material BL-118 that is dispersed in deionized photographic gelatin to form an emulsion. The liquid-crystal material is dispersed at 8% concentration in a 5% deionized gelatin aqueous solution. The mixture is dispersed to provide 10 micron diameter domains of the liquid crystal in aqueous suspension. The material is coated over patterned ITO first conductors 20 to provide a 9-micron-thick polymer-dispersed cholesteric coating. Other organic binders such as polyvinyl alcohol (PVA) or polyethylene oxide (PEO) can be used. Such compounds are machine coatable on various equipment, including but not limited to equipment associated with the making of photographic films. A conventional surfactant can be added to the emulsion to improve adhesion to first conductors 20. Conventionally known surfactants can be employed and provided at a concentration that corresponds to the critical micelle concentration (CMC) of the solution. A gel sub layer can be applied over the first conductors 20, prior to applying the polymer-dispersed cholesteric layer 30 and polymer-dispersed cholesteric layer 30. Such coatings are disclosed in copending patent U.S. Ser. No. 09/915,441 filed Jul. 26, 2001 by Stephenson et al., hereby incorporated by reference.

Second conductors 40 overlay polymer-dispersed cholesteric layer 30. Second conductors 40 should have sufficient conductivity to carry a field across the polymer-dispersed cholesteric layer 30. Second conductors 40 can be formed in a vacuum environment using materials such as aluminum, tin, silver, platinum, carbon, tungsten, molybdenum, tin or indium or combinations thereof. The metal material can be excited by energy from resistance heating, cathodic arc, electron beam, sputtering, or magnetron excitation. Oxides of said metals could be used to darken second conductors 40. Tin-oxide or indium-tin oxide coatings can permit second conductors 40 to be transparent to operate in conjunction with opaque first conductors 20. Vacuum deposited second conductors 40 can be areas delimited by etched areas in a conductive coating.

In a preferred embodiment, second conductors 40 are printed using a conductive ink such as Electrodag® 423SS screen-printable electrical conductive material from Acheson Corporation. Such printable materials are finely divided graphite particles in a thermoplastic resin. The second conductors 40 are formed using printed inks to reduce cost display. The use of a flexible support for substrate 15, laser etched first conductors 20, machine coated polymer-dispersed cholesteric layer 30, and printed second conductors 40 permit the fabrication of very low cost memory displays.

Figure 3:
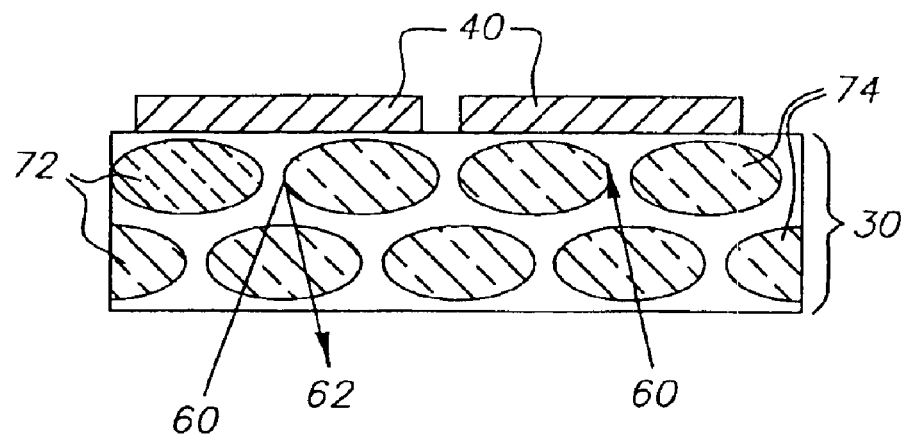
FIG. 3 is a sectional view showing a display element with cholesteric material in two stable optical states.

FIG. 3 is a sectional view showing a portion of a display with cholesteric material in two stable optical states in adjacent areas of the display. On the left, a higher voltage field has been applied and quickly switched to zero potential, which causes the liquid crystal molecules in domains to become planar liquid crystals 72. On the right, application of a lower voltage field has caused molecules of the cholesteric liquid crystal in the domains to break into transparent tilted cells that are known as focal-conic liquid crystals 74. Varying electrical field pulses can progressively change the molecular orientation from planar state 72 to a fully evolved and transparent focal conic state 74.

Light-absorbing second conductors 40 are positioned on the side opposing the incident light 60. A thin layer of light-absorbing submicron carbon in a gel binder can be disposed between second conductors 40 and polymer-dispersed cholesteric layer 30 as disclosed in copending U.S. Ser. No. 10/036,149 filed Dec. 26, 2001 by Stephenson, hereby incorporated by reference. Focal-conic liquid crystals 74 are transparent, passing incident light 60, which is absorbed by second conductors 40 to provide a black image. Progressive evolution from planar to focal-conic state causes a viewer to see an initial bright reflected light 62 that transitions to black as the cholesteric material changes from planar state 72 to a fully evolved focal-conic state 74. The transition to the light-transmitting state is progressive, and varying the low-voltage time permits variable levels of reflection. These variable levels can be mapped out to corresponding gray levels, and when the field is removed, polymer dispersed cholesteric layer 30 maintains a given optical state indefinitely. The states are more fully discussed in U.S. Pat. No. 5,437,811.

Figure 4:
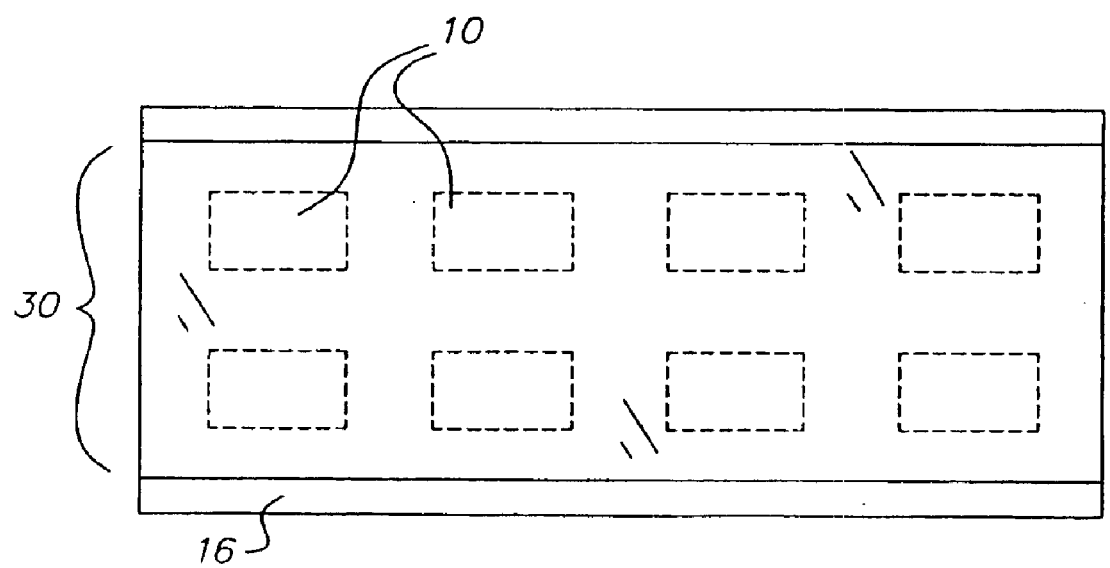
FIG. 4 is a top view of an array of display elements on a flexible substrate in accordance with prior art.

FIG. 4 is an array of display elements 10 having a flexible common substrate 16 in accordance with the prior art. U.S. Pat. No. 6,236,442 discloses coating an emulsion of polymer-dispersed cholesteric liquid-crystal material over common substrate 16 using photographic equipment. Such equipment creates a uniform coating over multiple display elements 10 and covers first conductors 20 on common substrate 16. The coated material must be removed or penetrated to form an electrical connection to first conductors 20. Material deposited outside areas defining display elements 10 is wasted.

Figure 5:
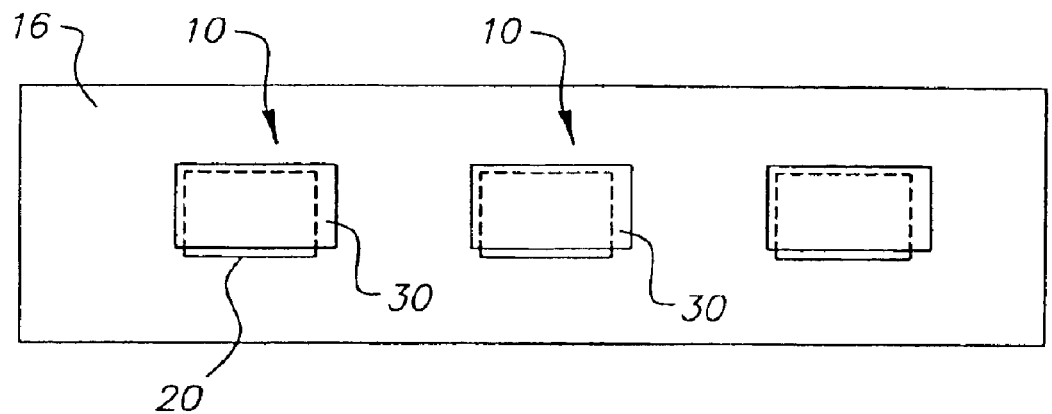
FIG. 5 is a top view of a continuous substrate having a plurality of display elements, in accordance with the present invention.

FIG. 5 is top view of a continuous common substrate 16 having a plurality of display elements 10 in accordance with the present invention. Sets of first conductors (outlined by the bounded area 20) on common substrate 16 are formed for each individual display element 10 on the common substrate 16. In accordance with one embodiment of the invention, polymer-dispersed cholesteric layer 30 is selectively deposited over each set of first conductors 20 in a manner that leaves portions of each of the first conductors 20 in the set of first conductors exposed for each display element 10. The method permits roll-to-roll manufacture of display elements on a common substrate 16 with minimal waste of deposited polymer-dispersed cholesteric layer 30.

Separate quantities of polymer dispersed cholesteric material 30 can be selectively deposited simultaneously and/or sequentially on all or a portion of a plurality of display elements 10 in an array. For example, a common mask can be used to simultaneously cover 2, 3, 4 or any number of display elements 10 in an array. The display elements 10 can be arrayed as shown if FIG. 5 or there can be any number of columns and rows on a moving web. Alternatively, a non-continuous common substrate 16 in the form of a separate sheet having an array, or plurality, of display elements 10 can be transported, for example by means of a conveyer belt.

Figure 6:
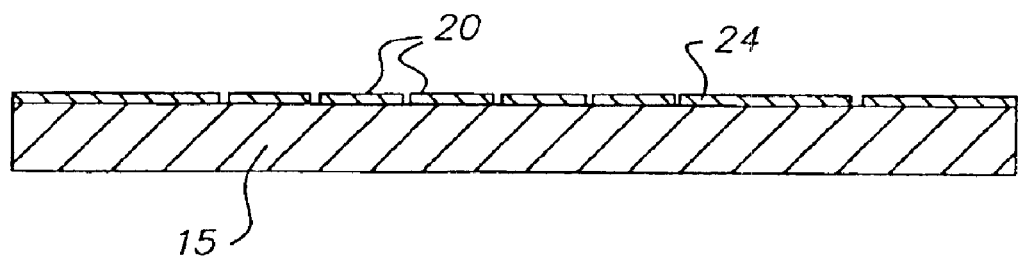
FIG. 6 is a side view of a sheet having patterned transparent first conductors.
Figure 7:
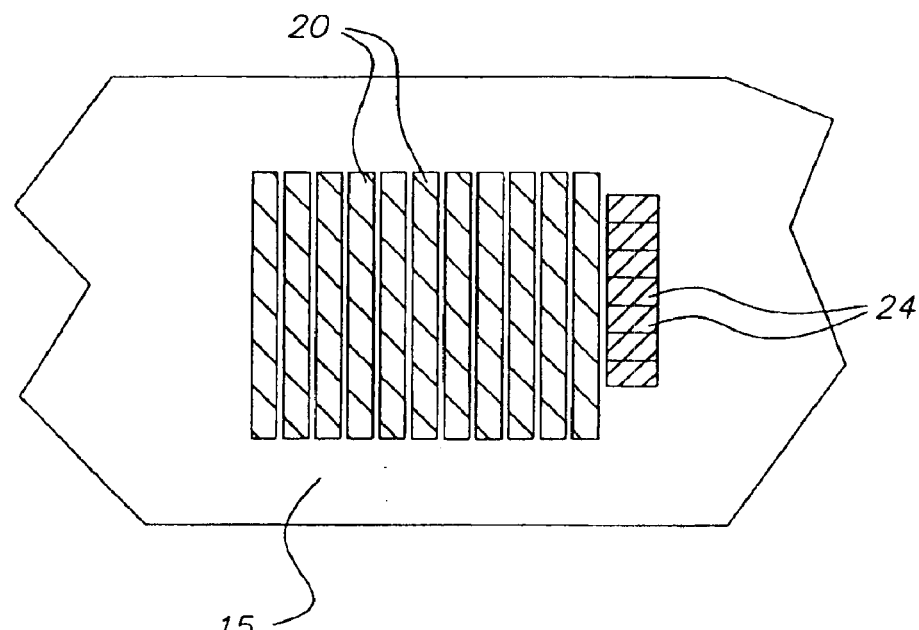
FIG. 7 is a top view of the sheet of FIG. 6 having patterned transparent first conductors.

FIG. 6 is a side view of a substrate 15 (as a portion of the common substrate 16) of FIG. 5 in which a set of patterned transparent first conductors 20 on common substrate 16 is shown. FIG. 7 is an extended top view of the individual display element of FIG. 6, having patterned transparent first conductors, on a common substrate 16. First conductors 20 can be formed by laser etching electrically separated areas on an ITO coating. First conductors can also be printed organic conductors such a PEDOT using conventional coating or printing techniques. In this particular embodiment, optional isolation pads 24 are provided as in certain configurations of the invention. Isolation pads 24 represent etched areas in a conductive coating in the case when substrate 15 is covered continuously with conductive material such as ITO prior to etching.

Figure 8:
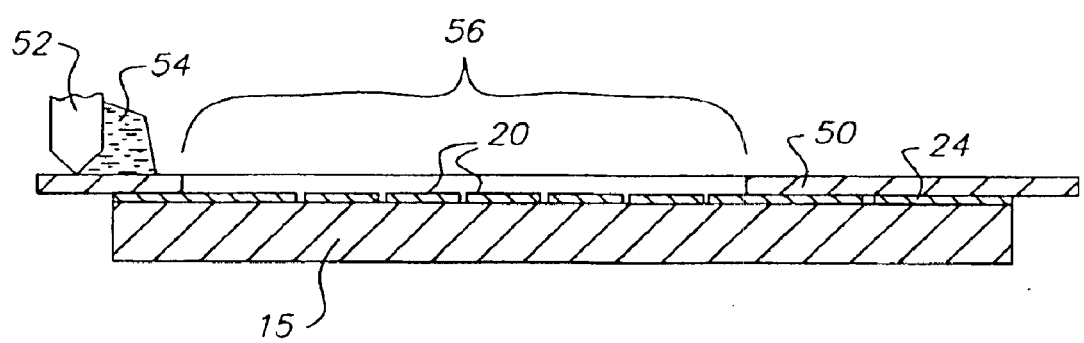
FIG. 8 is a side view of a sheet prepared for selective deposition of a liquid-crystal emulsion.
Figure 9:
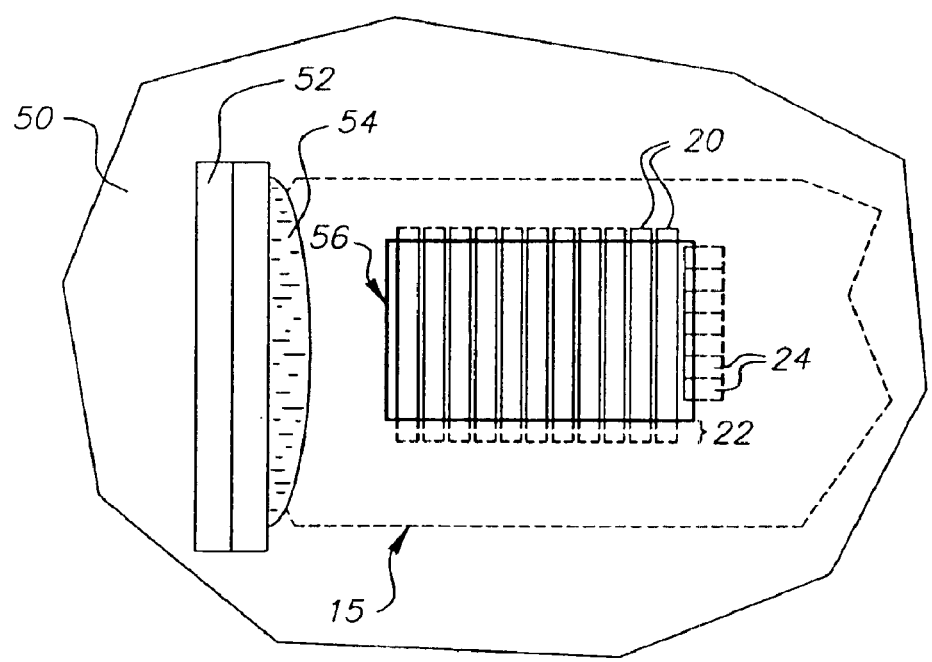
FIG. 9 is a top view of the sheet of FIG. 8 prepared for selective deposition of a liquid-crystal emulsion.

FIG. 8 is a side view of a substrate 15 as a portion of the common substrate 16 of FIG. 5, in which a set of patterned first conductors 20 is shown prepared for selective deposition. FIG. 9 is an extended top view of the display element of FIG. 8 prepared for selective deposition. Referring to FIGS. 8 and 9 together, a mask 50 is provided with an opening 56 which exposes a portion of first conductors 20 on sheet or substrate 15. Masked portions of first conductors 20 will form exposed first conductors 22. Mask 50 can be a sheet of thin stainless steel having a thickness of between 12 and 150 micrometers. In the exemplified embodiment, mask 50 is 50 micron thick stainless steel. An emulsion 54 according to the previously described formulation is placed on mask 50. The viscosity of emulsion 54 can be controlled by selecting a temperature that permits wetting of first conductors 20 with a uniform depth of material. The viscosity of emulsion 54 can also be controlled by the concentration of liquid carrier, in this case water, in emulsion 54. Blade 52 is used to move emulsion 54 across opening 56. Blade 52 has an edge that is flush with the surface of mask 50.

Figure 10:
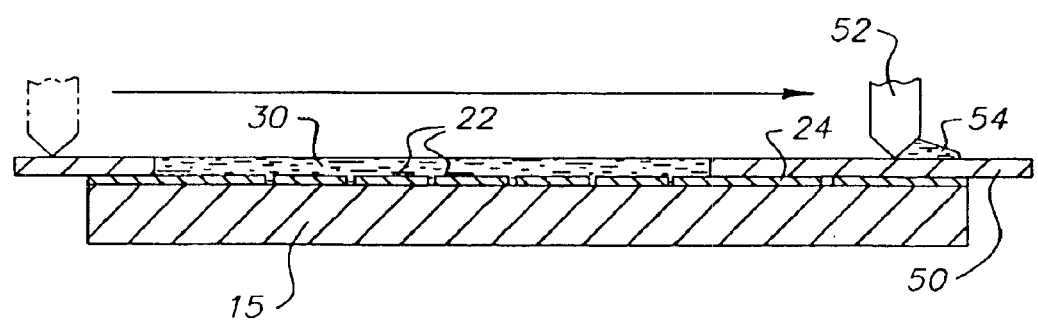
FIG. 10 is a side view of a sheet after selective deposition of a liquid-crystal emulsion on the sheet.
Figure 11:
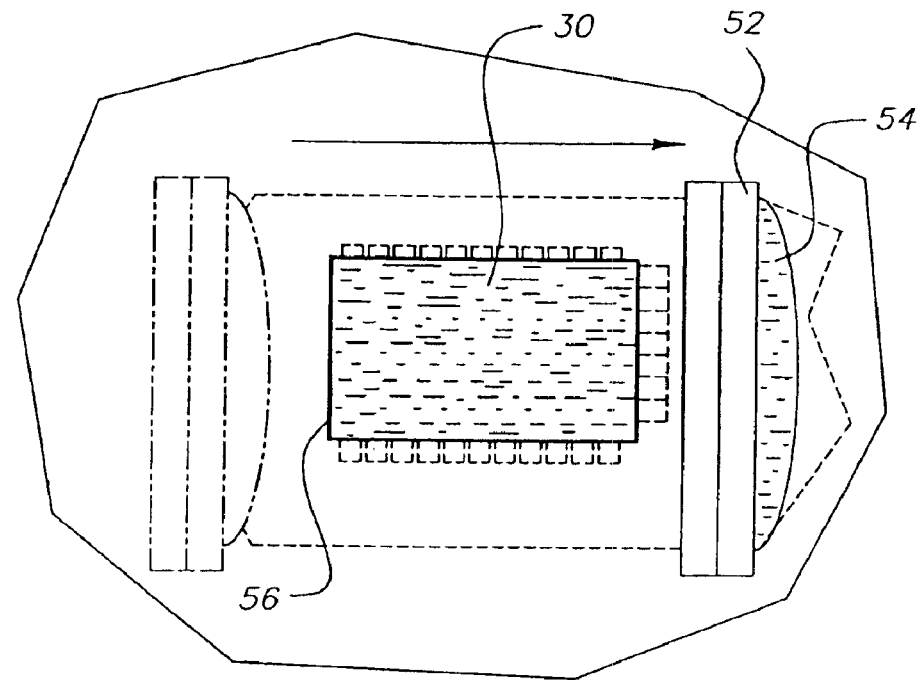
FIG. 11 is a top view of the sheet of FIG. 10 in which the liquid-crystal material has been selectively deposited.

FIG. 10 is a side view of a display element after accomplishing selective deposition of a liquid-crystal emulsion on the substrate 15 which is a portion of the common substrate 16. FIG. 11 is an extended top view of the display element of FIG. 10 after the selective deposition. Emulsion material 54 has been deposited as a wet polymer-dispersed cholesteric layer 30 through opening 56 over first conductors 20. The deposited emulsion thickness is set by the thickness of mask 50, the viscosity of emulsion material 54 and the speed of blade 52. In one embodiment, the parameters are selected to provide a 75-micron thick wet coating of emulsion material 54.

Figure 12:
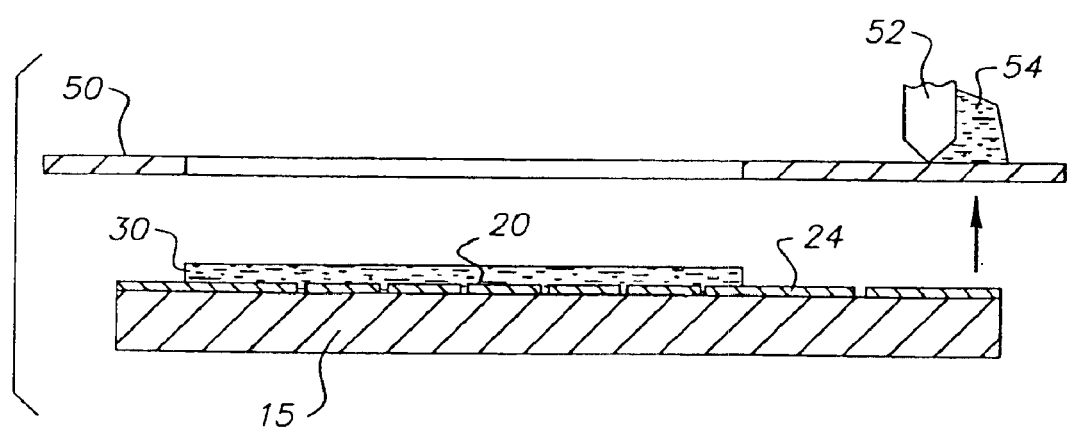
FIG. 12 is a side view of a sheet after selective deposition of a liquid-crystal emulsion on the sheet and showing the removal from the sheet of the apparatus used for selective deposition.
Figure 13:
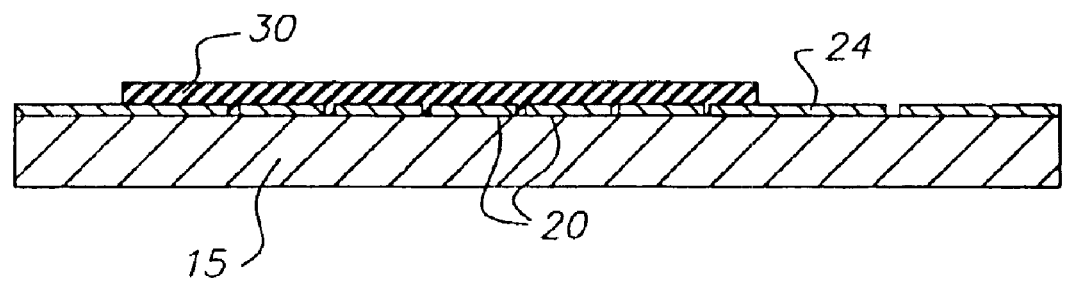
FIG. 13 is a side view of a sheet after a selectively deposited liquid-crystal emulsion has been dried.

FIG. 12 is a side view showing a substrate 15, as a portion of common substrate 16, having selectively deposited material over first conductors 20 and isolation pads 24, further showing the removal of apparatus for selective deposition of the material. In the exemplary embodiment, the solid content of the liquid-crystal material or emulsion is 13 percent by weight of the coating material. The carrier liquid, in this case water, comprises 87 percent of the volume. Removal of the carrier liquid through evaporation, significantly reduces the thickness of the deposited material. FIG. 13 is a side view of a sheet after a selectively deposited liquid-crystal emulsion has been dried. Dried polymer-dispersed cholesteric layer 30 coats first conductors 20 and isolation pads 24. In this example, the selectively deposited material, preferably in the form of a wet emulsion, can be deposited at 50 microns of thickness and dried to a thickness of approximately 9.7 microns.

Figure 14:
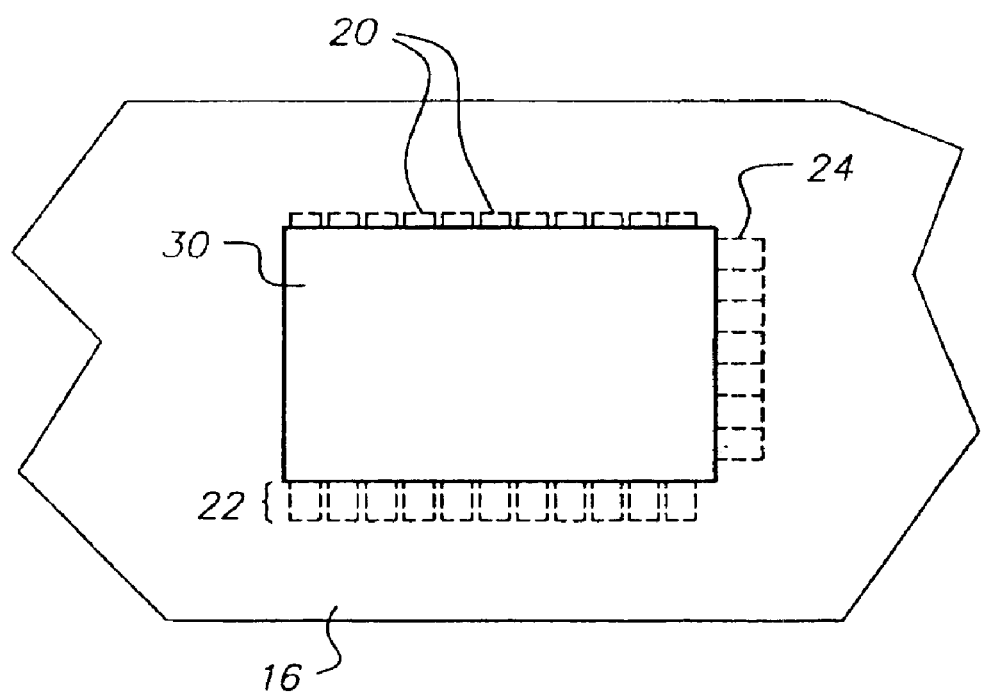
FIG. 14 is a top view of the sheet of FIG. 13 showing the dried selectively deposited liquid-crystal emulsion.

FIG. 14 is an extended top view of a display element in which dried cholesteric material has been selectively deposited over first conductors 20 and isolation pads 24, leaving uncovered areas of first conductors 22. The mask has provided a selectively deposited area of polymer-dispersed cholesteric layer 30, leaving exposed first conductors 22 and portions of isolation pads 24 uncovered. Material has been deposited only in areas needed for image display.

Other means for selectively depositing cholesteric material can be used. For example, instead of employing a mask, the polymer-dispersed cholesteric material can be deposited by gravure printing, screen printing, transfer printing, spray printing, inkjet printing, or other conventional printing means known to the skilled artisan.

Subsequent to the selective deposition of cholesteric material according to the present invention, second conductors can be applied to the display elements, for example, on the same moving web shown in FIG. 5 after selective deposition of the polymer dispersed cholesteric layer 30. Alternatively, second conductors 40 can be applied to display elements 10 after the array of display elements 10 have been divided or cut into discrete sheets containing a selected subset of display elements 10 or singulated into an individual display element 10.

Figure 15:
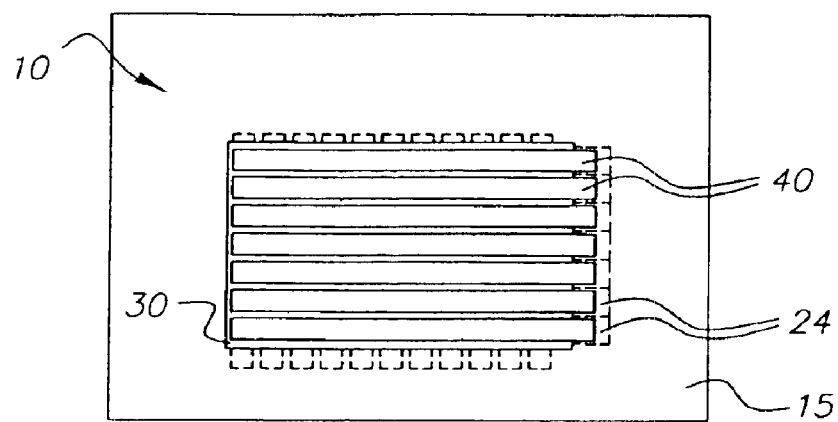
FIG. 15 is a top view of one embodiment of a display element after printing of the conductors is completed.

FIG. 15 is a top view of one embodiment of a completed display element 10 with printed second conductors 40. Second conductors 40 can be printed over dried polymer dispersed cholesteric layer 30. In the case where an ITO coating covers substrate 15 and first conductors 20 have been etched into the ITO coating, isolation pads 24 can be used to electrically isolate each second conductor 40 printed outside polymer-dispersed cholesteric layer 30.

Figure 16:
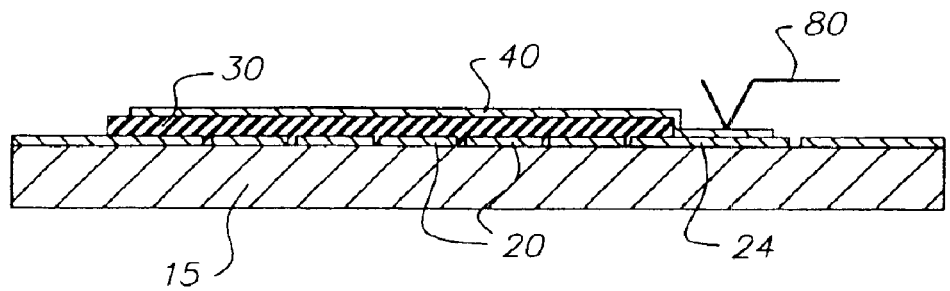
FIG. 16 is a side view of one embodiment of a display element with printed second conductors having electrically addressable pixels.
Figure 17:
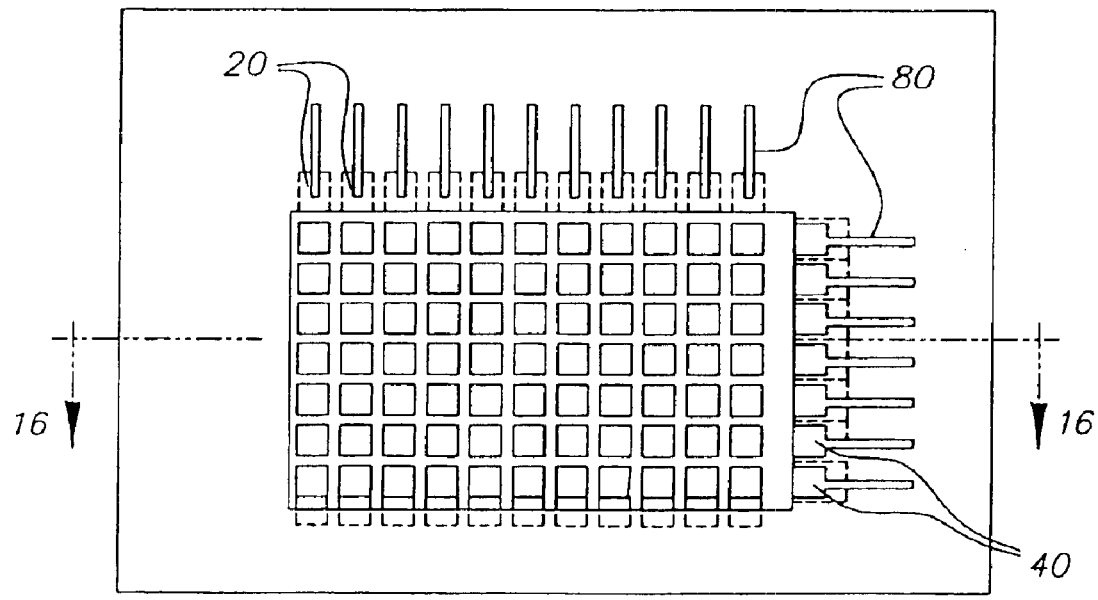
FIG. 17 is a top view of the display element of FIG. 16.

FIG. 16 is a bounded side view of a display element with printed second conductors having electrically addressable pixels, which side view is taken through section 16—16 of FIG. 17. FIG. 17 is an extended rear (bottom) view of the display element of FIG. 16. Referring to FIG. 16 and 17 together, contacts 80 are applied to each first conductor 20 and each second conductor 40. Appropriate electrical signals applied to first conductors 20 and second conductors 40 permit writing of image data onto display element 10.

Figure 18:
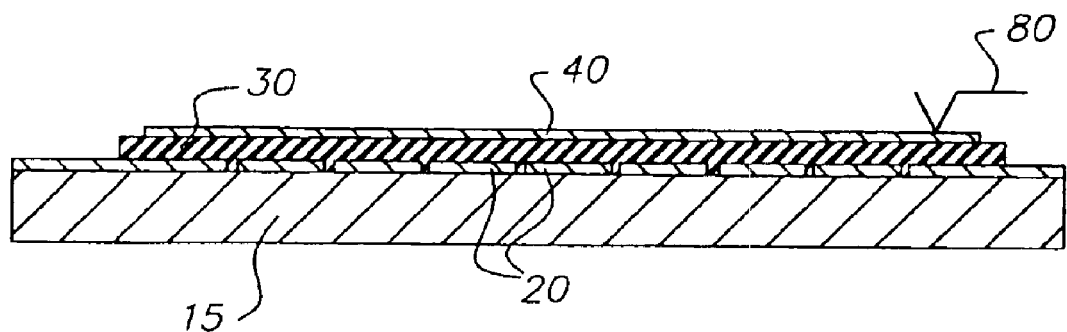
FIG. 18 is a side view of a second structural embodiment of a display element comprising a selectively deposited liquid-crystal material.

FIG. 18 is a side view of a second structural embodiment for a display element having selectively deposited cholesteric material over substrate 15. In this case, second conductors 40 are printed only over dried polymer-dispersed cholesteric layer 30. Isolation pads 24 are not needed, and contacts 80 are isolated by means of the 30 polymer-dispersed cholesteric layer 30.

Figure 19:
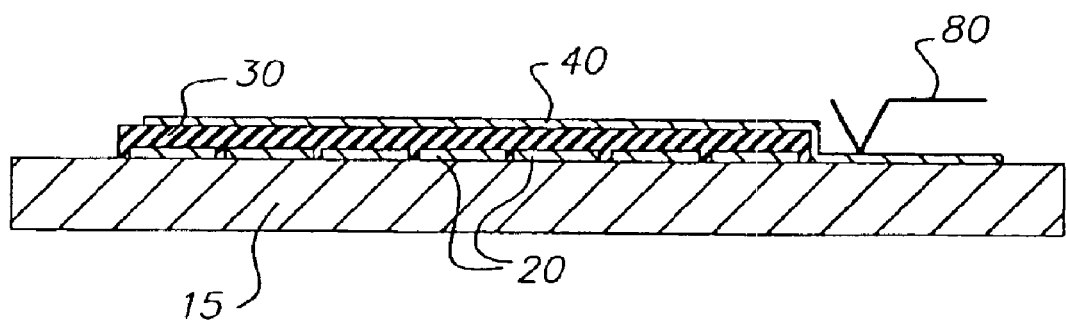
FIG. 19 is a side view of a third structural embodiment of a display element for a selectively deposited liquid-crystal material.

FIG. 19 is a side view of a third structural embodiment for a selectively deposited material on a display element. Conductive material does not exist on substrate 15 outside the areas defined by first conductors 20. Again, in this case, isolation pads 24 are not needed. Second conductors 40 can be printed outside dried polymer dispersed cholesteric layer 30 without being shorted together by extraneous conductive material.

Figure 20A:
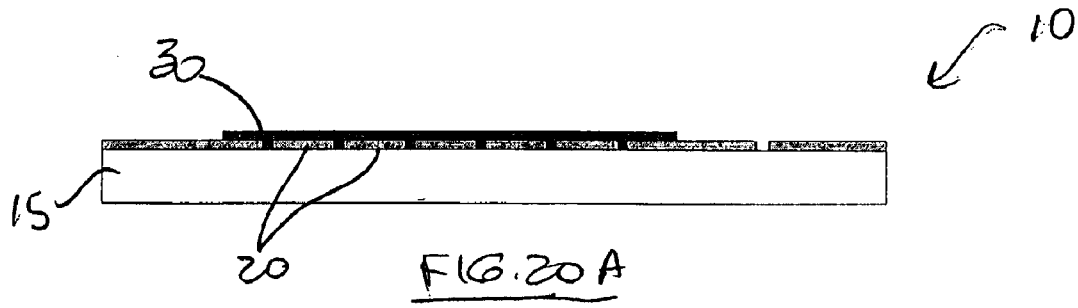
FIG. 20A, FIG. 20B, and FIG. 20C are side views illustrating the process steps for sequentially depositing two different selectively deposited coatings over a sheet comprising first conductors.
Figure 20B:
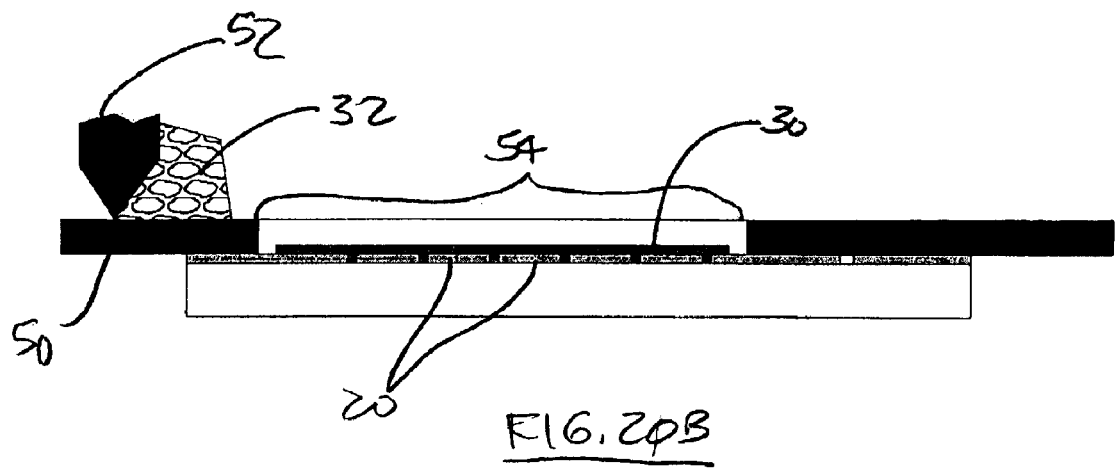
Figure 20C:
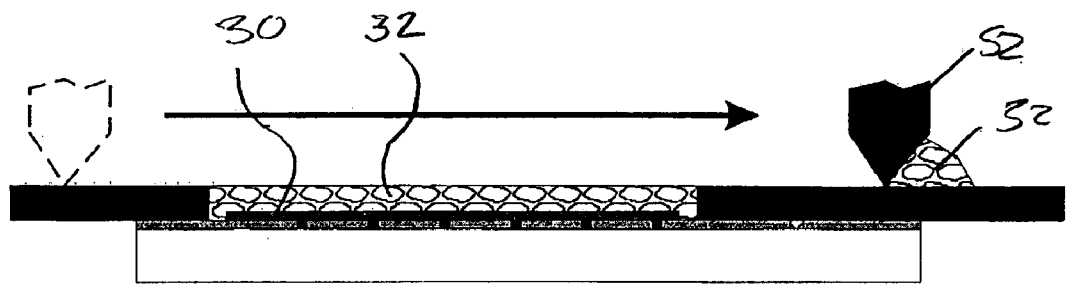

FIGS. 20A–C are side views of one embodiment of sequentially depositing two coatings, a second selectively deposited coating over a first selectively deposited coating. Referring to FIGS. 20 A, B, and C together, a second layer 32 can be a pigmented or dyed layer to improve the contrast of display element 10. Second layer 32 can also be an emulsion containing cholesteric liquid crystal different in properties than a first polymer-dispersed cholesteric layer 30, which second layer 32 can be applied after the first layer 30 is dried. FIG. 20A is a side view of a display element 10 having a selectively deposited and dried polymer dispersed cholesteric layer 30 over first conductors 20 and substrate 15. FIG. 20B is a side view of the display element of FIG. 20A positioned to receive a selectively deposited second layer over polymer dispersed cholesteric layer 30. Mask 50 is provided with an opening 56 which exposes a portion of first conductors 20. Mask 50 can be a sheet of thin stainless steel having a thickness of between 12 and 150 microns. In this embodiment, the mask 50 is 50 micron thick stainless steel. An emulsion 54 containing pigment and a binder is placed on mask 50. The viscosity of emulsion 54 is controlled by selecting a temperature that permits wetting of first conductors 20 with a uniform depth of material. Blade 52 is used to move emulsion 54 across opening 56. Blade 52 has an edge that is flush with the surface of mask 50. FIG. 22C is a side view after selective deposition of second layer 32. Second layer 32 contains a solvent which is then dried to provide a dried second layer 32 over dried polymer-dispersed cholesteric second layer 30.

The additional layer can also comprise a background nanopigment layer. The additional layer can comprise a differently colored cholesteric liquid-crystal material. The differently colored cholesteric liquid-crystal material can be a different wavelength of light reflected by the planar state, in order to provide multicolor displays.

Another aspect of the present invention relates to a display element in which the mask used for selective deposition is not removed prior to forming a plurality of second conductors, but is maintained as integral to the completed display element. Such a display element comprises (a) a substrate; (b) a plurality of first conductors formed over said substrate; (c) a layer comprising polymer-dispersed liquid-crystal in the form of domains of liquid crystal in a continuous matrix, which layer is formed over said first conductors so as to leave a portion of each of said first conductors uncoated; (d) between the first conductors and the substrate, a spacer element that has openings that are aligned with the areas covered by the layer of polymer-dispersed liquid-crystal, which spacer element had been used as a mask for selective deposition, and (e) a plurality of second conductors, electrically isolated from the first conductors, over said layer of polymer-dispersed liquid-crystal so that an electric field to the second conductors and said uncoated portions of the first conductors is capable of changing the optical state of the polymer dispersed liquid crystal. Such an integral spacer element, since it is used one, preferably is made from a low cost material such as a thermoplastic polymer, for example, a polyolefin or polyester material.

Another aspect of the present invention relates to an array of display elements 10, typically an intermediate in the manufacture of individual display elements 10, each display element 10 comprising (a) a common substrate 16; (b) two or more sets of first conductors 20, each set comprising a plurality of first conductors 20 forming a single display element 10, formed over said substrate 15; (c) over each set of first conductors 20, a layer of polymer-dispersed liquid-crystal material 30 deposited in a manner that leaves a portion of the first conductors in each set uncoated; (d) a corresponding number of sets of second conductors 40, each set of second conductors comprising a plurality of second conductors 40 forming a single display element 10 with a corresponding set of first conductors 20, which sets of second conductors 40 are each formed over each layer of polymer-dispersed liquid-crystal material 30, such that, for each set, an electric field applied to said second conductors 40 and said uncoated portions of said first conductors 22 is capable of changing the optical state of the polymer-dispersed cholesteric-liquid crystal material in a preselected portion of the layer of polymer-dispersed cholesteric liquid-crystal material 30. The array of display elements 10 can be positioned on a common substrate 16 that is a continuous web as in FIG. 5. Alternatively, the array of display elements 10 can be on a substrate 15 in the form of a non-continuous sheet. The array of display elements 10 can be arrayed in a plurality of columns and rows, the number of which may depend on the size of the manufacturing facility. As exemplified in the embodiment of FIG. 5, each individual display element in the array comprises a separate layer of polymer-dispersed cholesteric liquid-crystal material 30 that is non-contiguous (not in contact) with the layer of polymer-dispersed cholesteric liquid-crystal material 30 in every other display element 10 on the common substrate 16 in the array.

The displays described above can be combined with conventional components to obtain an integral self-contained system. For example, matrix driving of such cholesteric displays are well known in the art, as for example, described in U.S. Ser. No. 10/085,851 filed Feb. 28, 2002, hereby incorporated by reference in its entirety.

The invention has been described in detail with particular reference to certain preferred embodiments thereof, but it will be understood that variations and modifications can be effected within the spirit and scope of the invention.

Parts List 10 display element
15 display substrate
16 common substrate
20 first conductors
22 exposed first conductor
24 isolation pads
30 polymer-dispersed cholesteric layer
32 second layer
40 second conductors
50 mask
52 blade
54 emulsion material
56 opening in mask
60 incident light
62 reflected light
72 planar liquid crystal
74 focal-conic liquid crystal
80 contacts

What is claimed is:

1. A method of forming a display element comprising:
   a) providing a flexible web;
   b) forming a plurality of first conductors over said flexible web;
   c) depositing a layer of cholesteric liquid-crystal material, in the form of droplets of liquid crystal in a liquid carrier, over a preselected area of each of said first conductors so that a preselected portion of each of said first conductors is uncoated, wherein, the layer of cholesteric liquid-crystal material is simultaneously deposited on a plurality of display elements on the flexible web;
   d) drying said liquid carrier to form a layer comprising domains of polymer-dispersed cholesteric liquid-crystal in a continuous matrix;
   e) forming a plurality of second conductors, electrically isolated from the first conductors, over said layer of polymer-dispersed liquid-crystal domains so that an electric field between the second conductors and said uncoated portions of the first conductors is capable of changing the optical state of the polymer-dispersed cholesteric liquid-crystal.

2. A method of forming a display element comprising:
   a) providing a substrate;
   b) forming first conductors over said substrate;
   c) masking portions of said first conductors;
   d) depositing a layer of cholesteric liquid-crystal material, in the form of droplets of liquid crystal in a liquid carrier, over a preselected area of each of said first conductors so that a preselected portion of each of said first conductors is uncoated;
   e) drying said liquid carrier to form a layer comprising domains of polymer-dispersed cholesteric liquid-crystal in a continuous matrix;
   f) forming a plurality of second conductors, electrically isolated from the first conductors, over said layer of polymer-dispersed liquid-crystal so that an electric field between the second conductors and said uncoated portions of the first conductors is capable of changing the optical state of the polymer dispersed cholesteric liquid crystal material.

3. The method of claim 2 wherein the mask is removed prior to forming a plurality of second conductors.

4. The method of claim 2 wherein the mask is not removed prior to forming a plurality of second conductors, but is maintained as integral to the completed display element.

5. The method of claim 2 wherein, in step (d), the cholesteric liquid-crystal material is spread over the mask by a doctor blade.

6. The method of claim 1 wherein the substrate is one of multiple substrates on a common web.

7. The method of claim 1 wherein the liquid carrier comprises gelatin in solution.

8. The method of claim 1 wherein the first conductors are transparent.

9. The method of claim 8 wherein the first conductors are made from a vacuum deposited transparent conductor.

10. The method of claim 1 wherein the first conductors are laser etched.

11. The method of claim 1 wherein the second conductors are vacuum deposited or solvent coated.

12. A display element comprising:
   a) a substrate;
   b) a plurality of first conductors formed over said substrate;
   c) a layer comprising polymer-dispersed liquid-crystal in the form of domains of liquid crystal in a continuous matrix, which layer is formed over said first conductors so as to leave a portion of each of said first conductors uncoated; and
   d) between the first conductors and the substrate, a spacer element that has openings that are aligned with the areas covered by the layer of polymer-dispersed liquid-crystal;
   e) a plurality of second conductors, electrically isolated from the first conductors, over said layer of polymer-dispersed liquid-crystal so that an electric field to the second conductors and said uncoated portions of the first conductors is capable of changing the optical state of the polymer dispersed liquid crystal.

13. An array of display elements, each display element comprising:
   a) a common substrate which is a continuous web;
   b) two or more sets of first conductors, each set comprising a plurality of first conductors forming a single display element, formed over said common substrate;
   c) over each set of first conductors, a layer of polymer-dispersed liquid-crystal material deposited in a manner that leaves a portion of the first conductors in each set uncoated, wherein the layer of polymer-dispersed cho lesteric liquid-crystal material in each display element is non-contiguous and separate from the layer of polymer-dispersed cholesteric liquid-crystal material in every other display element on the common substrate;

d) a corresponding number of sets of second conductors, each set of second conductors comprising a plurality of second conductors forming a single display element with a corresponding set of first conductors, which sets of second conductors are each formed over each layer of polymer-dispersed liquid-crystal material, such that, for each set, an electric field applied to said second conductors and said uncoated portions of said first conductors is capable of changing the optical state of the polymer-dispersed cholesteric-liquid crystal material in a preselected portion of the layer of polymer-dispersed cholesteric liquid-crystal material.

14. The array of display elements in claim 13 wherein the common substrate is a non-continuous sheet.

15. The array of display elements in claim 13 wherein the preselected portion of the layer of polymer-dispersed cholesteric liquid-crystal material covers the overlapping portions of the first and second conductors.

16. The array of display elements in claim 13 wherein the sets of first conductors, each set in combination with the corresponding set of second conductors, are arrayed in a plurality of columns and rows.

* * * * *